United States Patent [19]

Spiero et al.

[11] Patent Number: 5,255,097
[45] Date of Patent: Oct. 19, 1993

[54] VIDEO SYSTEM

[75] Inventors: Richard C. Spiero; Theodorus H. C. Van Groningen, both of Eindhoven, Netherlands

[73] Assignee: U.S. Philips Corporation, New York, N.Y.

[21] Appl. No.: 628,275

[22] Filed: Dec. 14, 1990

[30] Foreign Application Priority Data

Jan. 19, 1990 [NL] Netherlands .................. 9000130

[51] Int. Cl.$^5$ ................ H04N 5/14; H04N 5/46
[52] U.S. Cl. .............................. 358/181; 358/188
[58] Field of Search ...................... 358/181, 188

[56] References Cited

U.S. PATENT DOCUMENTS

| | | | |
|---|---|---|---|
| 4,802,000 | 1/1989 | Willis | 358/181 |
| 4,808,992 | 2/1989 | Beyers | 358/181 |
| 4,860,098 | 8/1989 | Murphy | 358/188 |
| 4,996,597 | 2/1991 | Duffield | 358/181 |
| 5,034,818 | 7/1991 | Baik-Hee | 358/181 |
| 5,041,910 | 8/1991 | Suda | 358/181 |
| 5,095,363 | 3/1992 | Zuffada | 358/188 |

Primary Examiner—Howard W. Britton
Attorney, Agent, or Firm—Edward W. Goodman

[57] ABSTRACT

A video system comprises a video signal generating device (1') and no less than one video signal receiving device (2') coupled to each other by means of a signal bus (4'). The video signal generating device (1') is capable of generating at an output (13) one or a plurality of video signals having each a different signal format (CVBS, Y/C, MAC bb, ...). The video signal receiving device(s) is (are) arranged for processing one or a plurality of video signals having mutually different formats. It is an object to establish which video signal format the devices (1', 2', 3') have in common (Y/C) and to adjust the devices so that the video signal generating device generates at its output (13) just the video signal that has the common signal format concerned and the video signal receiving device(s) is (are) capable of processing the video signal that has the common signal format concerned and is applied to the input (24, 33). If two or more video signal formats appear to be common to the devices a choice is made in favor of one of these formats, preferably the video signal format having the highest video signal quality.

23 Claims, 5 Drawing Sheets

| 37.1 CVBS | 37.2 Y/C | 37.3 RGB | 37.4 MAC bb | choice |
|---|---|---|---|---|
| 1 | 0 | 0 | 0 | CVBS |
| 0 | 1 | 0 | 0 | Y/C |
| 0 | 0 | 0 | 1 | MAC bb |
| 1 | 1 | 0 | 0 | Y/C |
| 1 | 0 | 0 | 1 | MAC bb |
| 1 | 1 | 0 | 1 | MAC bb |
| 0 | 1 | 0 | 1 | MAC bb |
| no acknowledge | | | | CVBS |

FIG.6

| CVBS | Y/C | RGB | MAC bb | |
|---|---|---|---|---|
| 1 | 0 | 0 | 0 | CVBS |
| 0 | 1 | 0 | 0 | Y/C |
| 0 | 0 | 1 | 0 | RGB |
| 1 | 1 | 0 | 0 | Y/C |
| 1 | 0 | 1 | 0 | RGB |
| 0 | 1 | 1 | 0 | Y/C or RGB |
| 1 | 1 | 1 | 0 | Y/C or RGB |

FIG.7

| CVBS | Y/C | RGB | MAC bb | |
|---|---|---|---|---|
| 0 | 1 | 0 | 0 | Y/C |
| 0 | 0 | 1 | 0 | MAC bb |
| 0 | 1 | 1 | 0 | MAC bb |

FIG.8

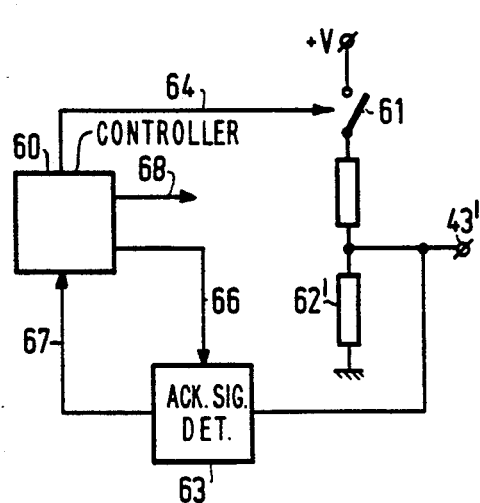
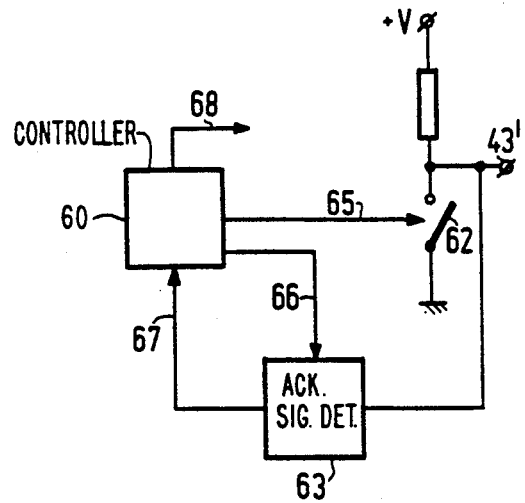
FIG.9a    FIG.9b
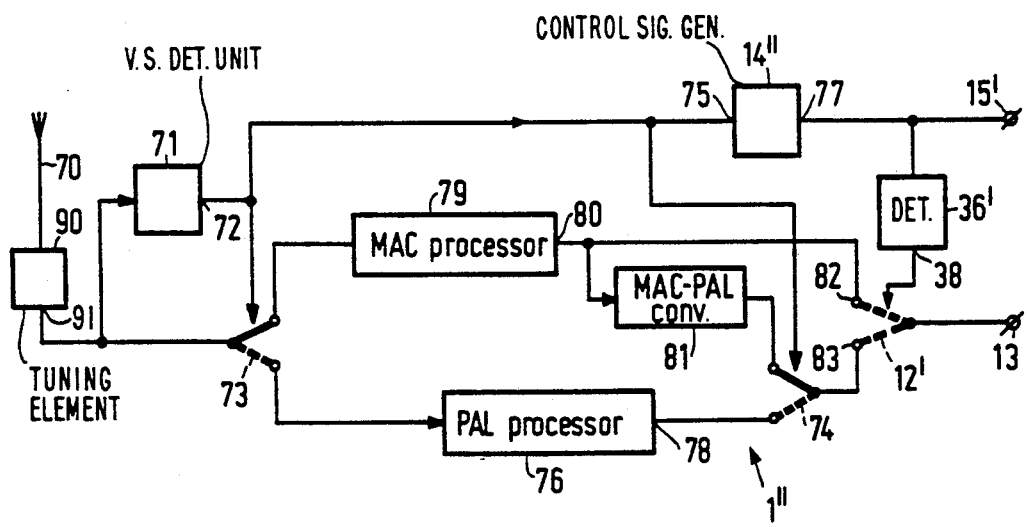
FIG.10

VIDEO SYSTEM

BACKGROUND OF THE INVENTION

1. Field of the Invention

The invention relates to a video system comprising a video signal generating device and at least one video signal receiving device and a signal bus, the video signal generating device having a video signal output for producing a video signal and the video signal receiving device having a video signal input for receiving the video signal, while the video signal input can be coupled to the video signal output of the video signal generating device over the signal bus.

The invention likewise relates to a video signal generating device and a video signal receiving device to be used in the video system.

2. Description of the Related Art

A video system of the type set forth in the preamble is known, for example, from Funk-Technik 38 (1983), Vol. 5, pp. 208-212. For example, the video signal generating device can be a video tuner and the video signal receiving device can then be a television picture screen on which the video signal produced by the tuner can be displayed, or a video recorder on which the video signal produced by the tuner can be recorded. Another possibility is that the video recorder is the video signal generating device. The signal reproduced by the video recorder can now be applied over the signal bus to the television screen for visualizing the video signal. It may be evident that the system may optionally include one or a plurality of receiving devices. Furthermore, the system may optionally include one or a plurality of video signal generating devices. However, the invention describes the cooperation of a video signal generating device with one or a plurality of video signal receiving device. These devices can be coupled to each other over a signal bus, for example, the SCART bus as described in aforementioned publication.

SUMMARY OF THE INVENTION

It is an object of the invention to provide a video system that has great user-friendliness and provides more options within the scope of future developments of video systems.

For this purpose, the video system according to the invention is characterized in that the video signal generating device is capable of generating a video signal according to x number of video signal formats from y number of video signal formats, in that the video signal receiving device is suitable for receiving and processing a video signal according to z number of video signal formats from the y number of video signal formats, in that for y it holds that $y > 1$, and for x and z it holds that $1 \leq x \leq y$ and $1 \leq z \leq y$, in that the video signal generating device comprises a control signal generator for generating a first control signal for each of the x video signal formats and/or for generating a second control signal for each of the y-x remaining video signal formats and for delivering the x first and/or y-x second control signals at a control signal output of the video signal generating device, in that the video signal receiving device comprises a control signal generator for generating the first control signal for each of the z video signal formats and/or for generating the second control signal for each of the y-z remaining video signal formats and for producing the z first and/or y-z second control signals at a control signal output of the video signal receiving device, in that the control signal outputs of the video signal generating device and the video signal receiving device can be coupled to each other over the signal bus, in that the video system comprises a detector unit arranged for establishing, in response to the first and/or second control signals, the p video signal formats common to the various devices from the y video signal formats, in that the detector unit thereto has an input coupled to the control signal output of a device and has an output for producing for $p=1$ a detector signal characteristic of the common video signal format and for producing for $p \geq 2$ a detector signal that is characteristic of one of the p common video signal formats, for applying the detector signal to the devices, in that the video signal generating device is arranged for producing a video signal at its video signal output according to the common video signal format established by the detector unit in response to the detector signal, and in that the video signal receiving device is arranged for adjusting the receiving device in response to the detector signal so that the video signal can be processed by the receiving device according to the video signal format determined by the detector unit.

The invention is based on the following understanding. Future video signal generating devices will be able, more and more often, to generate video signals according to more than one video signal format. With video signal formats, one may think of, for example, the CVBS (chroma-video-blanking-sync) signal, that is to say, a signal comprising both the chrominance and the luminance component of the video signal in a combined form; the Y/C signal, in which the chrominance and luminance components are presented separately; the Y-U-V or the R-G-B signal; or the MAC signal. Also future video signal receiving devices will be able, more and more often, to process video signals according to more than one video signal format.

It is an object of the invention to provide a method of making a correct choice as to the cooperation of a video signal generating device with one or more video signal receiving devices in a video system with respect to the video signal format to be generated by the video signal generating device.

Since the various devices are able to indicate by means of the control signals which video signal formats they can handle and/or which video signal formats they cannot handle, the system is able to make a choice. The system thereto chooses a video signal format held in common at any rate by the devices then activated.

It is possible for the detector unit to establish that at least two video signal formats are common to the activated devices. In that case one video signal format is to be selected by the detector unit. For example, if there are two common video signal formats of which one format has a greater video signal quality (for example MAC) than the other format (for example CVBS), the detector unit can detect the video signal format having the higher video signal quality (MAC). If the devices have two equivalent video signal formats in common, for example YU-V and R-G-B, the detector unit can be predetermined to select, for example, the Y-U-V format.

Basically, a single detector unit included in one of the devices will suffice. In that case the output of the detector unit is coupled to a detector signal output of this device and the other device(s) has (have each) a detector signal input which may be coupled over the signal bus to the detector signal output of said one device.

The video signal generating device and at least one video signal receiving device can also comprise each a detector belonging to the detector unit arranged for establishing the p common video signal formats and for generating the detector signal, in that the detectors thereto have each an input coupled to the control signal output of the associated device and an output for producing for p=1 the detector signal that is characteristic of the common signal format and for producing for p≧2 the detector signal that is characteristic of one and the same video signal format of the p common video signal, in that the video signal generating device is arranged for producing a video signal at its video signal output in response to the detector signal of the associated detector according to the common video signal format selected by this detector, and in that the video signal receiving device is arranged for adjusting the receiving device in response to the detector signal of the associated detector in such a way that the video signal applied to its video signal input can be processed.

The control signal outputs of the devices have each y sub-outputs, while each of the y control signal sub-outputs of a device corresponds to one of the y video signal formats, in that each of the y control signal sub-outputs of a device can be coupled to a corresponding sub-output of the y control signal sub-outputs of the other devices over an associated signal line in the signal bus, and in that the control signal generator in a device has y outputs, each of the y outputs being coupled to an associated control signal sub-output of the device, in that the control signal generator in the video signal generating device is arranged for producing the first control signal at the x outputs corresponding to the x video signal formats and/or for producing the second control signal at the y-x remaining outputs, and in that the control signal generator in the video signal generating device is arranged for producing the first control signal at the z outputs corresponding to the z video signal formats and/or for producing the second control signal at the y-z remaining outputs. However, it is likewise possible to use only a single line in the line bus for control signal transmission. In that case the control signal generator in the video signal generating device is arranged for serially generating, in a specific fixed order for the y video signal formats, the x first control signals for each of the x video signal formats and/or for serially generating the y-x second control signals for each of the y-x remaining video signal formats, in that the control signal generator in the video signal receiving device is arranged for serially generating in the same order for the y video signal formats, the z first control signals for each of the z video signal formats and/or for serially generating the y-z second control signals for each of the yz remaining video signal formats, and in that an output of a control signal generator is coupled to the control signal output of the associated device. Since the number of y video signal formats is fixed, it could be sufficient to allow each device to generate a first control signal for those video signal formats for which the device itself can suitably be used. Another possibility is to allow the device to generate only a second control signal for those signal formats for which the device cannot suitably be used.

Alternatively, it is possible for the devices to generate both the first and the second control signals.

Yet another possibility is, for example, that only the video signal generating device generates both the first and the second control signals for those video signal formats for which this generating device is suitable or unsuitable, respectively. The receiving devices can then generate, for example, only the second control signals. If these second control signals are dominant (that is to say, if a first control signal is applied by a first device and a second control signal is applied by a second device to one and the same line in the signal bus, the second control signal will appear on this line) it will only be necessary to detect for which video signal formats a first auxiliary signal is still present on the line.

BRIEF DESCRIPTION OF THE DRAWINGS

The invention will be further explained with reference to a number of exemplary embodiments in the following descriptions, in which:

FIGS. 6, 7 and 8 show Tables clarifying the selection of a specific signal format based on the control signals for three devices;

FIGS. 9a and 9b show two different exemplary embodiments of the control signal generator; and FIG. 10 shows an exemplary embodiment of a video signal generating device.

DESCRIPTION OF THE PREFERRED EMBODIMENT

Figure 1:
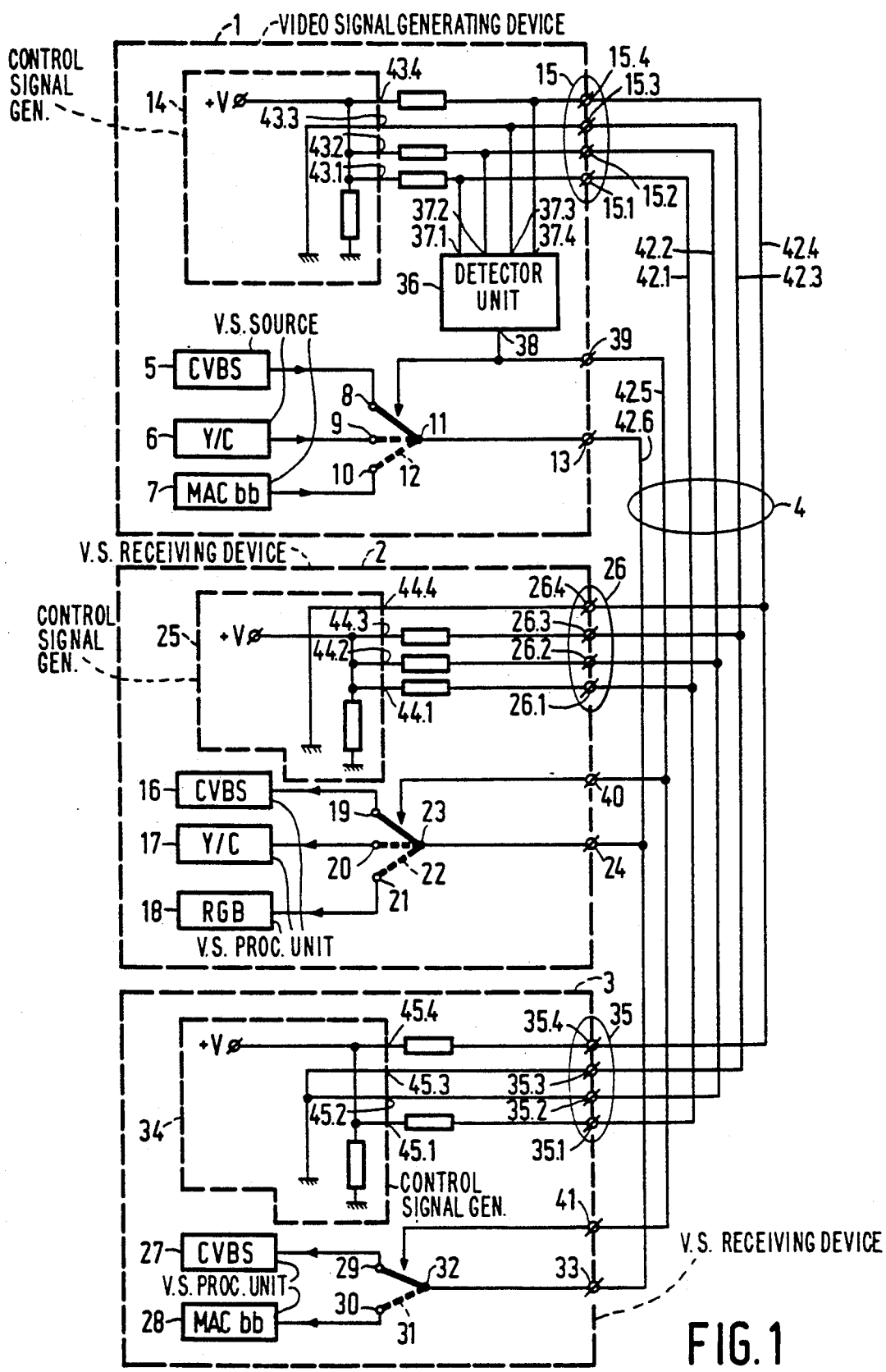
FIG. 1 shows a first exemplary embodiment.

FIG. 1 shows a video system comprising a video signal generating device 1, a video signal receiving device 2, a video signal receiving device 3 and a signal bus 4. The video signal generating device 1 is arranged for generating a video signal according to the CVBS format, a video signal according to the Y/C format and a video signal according to the MAC baseband format. The MAC baseband format is described, for example, in Funkschau 18/1985, pp. 59-63, more specifically, FIG. 1.

It should be observed in this respect that the video signals are derived (may be derived) from the same picture signal so that in fact the same video signal is concerned which can be generated in the three formats described. In addition, if a video signal according to the Y/C format is concerned, it is a matter of two separate signals, that is to say, the luminance signal y and the chrominance signal C. These signals are in fact to be transported over two separate lines.

The video signal generating device comprises three video signal sources 5, 6 and 7 for generating the video signals according to the above three formats CVBS, Y/C and MAC baseband, respectively. Outputs of these sources are coupled to associated terminals 8, 9 and 10, respectively, of controllable switching means in the form of a three-state switch 12. A terminal 11 of this switch 12 is coupled to the video signal output 13 of the device 1. Since the signal source 6 ought to have two outputs, the switch 12 actually ought to look differently and video signal output 13 of device 1 actually ought to be constituted by two outputs. However, the diagrammatic representation as shown in FIG. 1 will suffice for the explanation.

The device 1 comprises a control signal generator 14 having four outputs coupled to four sub-outputs 15.1, 15.2, 15.3 and 15.4 of a control signal output 15 of the device 1.

Device 2 comprises three video signal processing units 16, 17 and 18 arranged for processing a video signal according to the following respective formats: CVBS, Y/C and RGB. The inputs to the units 16, 17 and 18 are coupled to the terminals 19, 20 and 21, respectively, of controllable switching means constituted by a three-state switch 22. The terminal 23 of this switch 22 is coupled to the video signal input 24 of the device 2. The device 2 comprises a control signal generator 25 whose four outputs are coupled to sub-outputs 26.1, 26.2, 26.3 and 26.4 of a control signal output 26.

Needless to observe that what has been stated with respect to the video signal source 6 in device 1 holds in like manner for the video signal processing units 17 and 18. The unit 17 actually has two inputs for receiving the two components Y and C and the unit 18 has three inputs for receiving the three color components red, green and blue. This means that the video signal input 24 actually comprises three terminals. The three-state switch 22 therefore shows only diagrammatically the operation of the device. However, this will be sufficient for a proper understanding.

Device 3 comprises two video signal processing units 27 and 28 for processing a CVBS or a MAC baseband signal, respectively. The inputs to these units 27 and 28 are coupled to terminals 29 and 30, respectively, of controllable switching means constituted by a two-state switch 31. One terminal 32 of this switch 31 is coupled to the video signal input 33 of device 3. A control signal generator 34 again has four outputs coupled to sub-outputs 35.1, 35.2, 35.3 and 35.4 of a control signal output 35 of device 3.

The video system further includes a detector unit 36 shared by the entire system, but included in device 1. The detector unit 36 has four inputs 37.1, 37.2, 37.3 and 37.4 coupled to the control signal sub-outputs 15.1 to 15.4, and has an output 38. This output is coupled to the control signal input of switch 12 and to detector signal output 39 of device 1.

The devices 2 and 3 have each a detector signal input 40 or 41, respectively. The detector signal input 40 is coupled to a control signal input of switch 22 and the detector signal input 41 is coupled to a control signal input of switch 31.

The signal bus 4 comprises four lines for conveying the control signals between the various devices. For this purpose, the terminals 15.1, 26.1 and 35.1 are coupled to each other over line 42.1. So are the terminals 15.2, 26.2 and 35.2 through line 42.2. The terminals 15.3, 26.3 and 35.3 are coupled to each other over line 42.3 and terminals 15.4, 26.4 and 35.4 are coupled to each other over line 42.4. The detector signal of the detector 36 presented at output 39 is applied to the detector signal inputs 40 and 41 of the respective devices 2 and 3 over line 42.5 in the signal bus 4.

The video signal output 13 of device 1 is coupled to the video signal inputs 24 and 33 of the devices 2 and 3 over line 42.6 in the signal bus 4. The aforementioned may have distinctly shown that the line 42.6 in fact is to comprise no less than three separate signal conductors for transmitting the RGB signal. If a Y/C video signal is transmitted, two of these three signal conductors can be used and if the transmitted video signal is a CVBS or a MAC baseband signal no more than one of the three signal lines is used. If the SCART cable known per se were used for a signal bus, the distribution of the various video signal components over the various lines in the SCART cable would be different. The SCART cable comprises three separate lines for the three color components red, green and blue. The SCART cable further includes a separate line for the CVBS video signal. However, if a Y/C video signal is transmitted through a SCART cable, the Y component will be conveyed over the CVBS line and the C component over one of the three lines for the RGB signal.

The control signal generator 14 delivers at the outputs 43.1, 43.2 and 43.4 a first control signal in the form of a voltage of V volts. V is unequal to 0 and has a value of, for example, 10 volts. The voltage of V volts at the output 43.1 denotes that the device 1 is able to generate a CVBS video signal. The voltage of V volts at the output 43.2 denotes that the device 1 is able to generate a video signal according to the Y/C format. The voltage of V volts at the output 43.4 denotes that the device 1 is able to generate a MAC baseband signal. The output 43.3 in the generator 14 is connected to ground. This means that there is a second control signal in the form of a zero voltage at the output 43.3 which means that the device 1 is unable to generate a RGB video signal.

The control signal generator 25 delivers a first control signal in the form of a voltage of V volts at the outputs 44.1, 44.2 and 44.3, which denotes that the device is able to process a video signal according to the CVBS, Y/C and RGB formats. The device is unable to process a MAC baseband signal. Therefore, the generator 25 produces a zero voltage at the output 44.4.

Since the device 3 is only capable of processing a CVBS and a MAC baseband signal, the outputs 45.1 and 45.4 carry a voltage of V volts and the outputs 45.2 and 45.3 a zero voltage. Due to the zero voltage at the output 44.4, a zero voltage will also occur on the line 42.4 in the signal bus 4. A zero voltage will also occur on the lines 42.2 and 42.3 in the signal bus due to the zero voltage on the outputs 45.2 and 45.3. Only line 42.1 will carry a voltage of V volts.

The detector 36 detects that there is a high voltage only on input 37.1. Thus, the detector 36 knows that the three devices have the CVBS video signal format in common. The detector 36 produces at its output 38 a detector signal so that in response to this detector signal, switch 12 switches to the state in which terminals 8 and 11 are coupled to each other. As this detector signal is also applied to the switches 22 and 31 in the devices 2 and 3 over line 42.5 in the signal bus 4, this detector signal also provides that the switch 22 is moved to the state in which the terminals 19 and 23 are coupled to each other and provides that switch 31 is moved to the state in which terminals 29 and 31 are coupled to each other.

A CVBS video signal is now presented at output 13 by the device 1 and applied to the inputs 24 and 33 of the respective devices 2 and 3 over line 42.6 in the signal bus 4. In these devices 2 and 3, the video signal is applied to the CVBS video signal processing units 16 and 27, respectively, in which the CVBS video signal can be processed. The device 2 may be a video recorder in which the video signal is recorded on a magnetic record carrier. The device 3 may be a picture screen on which the video signal is displayed as a picture signal.

Let us assume that the device 3 is switched off. Switching off this device means that the outputs 45.1 to 45.4 of the control signal generator 34 become ungrounded. This means that these outputs are disconnected from the +V voltage and from ground when the switches (not shown) in the detector 34 are opened. Consequently, the two lines 42.1 and 42.2 reach a voltage of +V volts. The detector 36 now detects that the devices 1 and 2 have the video signal formats CVBS and YIC in common. The detector 36 may now choose the format having the higher picture quality, which in this case is the Y/C format. Thereupon the detector 36 produces a detector signal so that the switch 12 is moved to the state in which terminals 9 and 11 are coupled to each other and switch 22 is moved to a state in which terminals 20 and 23 are coupled to each other.

Let us now assume that, starting from the initial situation in which the three devices are coupled to each other and all three of them are in operation, device 2 is switched off. The outputs 44.1 to 44.4 of the signal control generator 25 all become ungrounded now. This causes the lines 42.1 and 42.4 to carry a high voltage. The detector 36 detects that the devices 1 and 3 have the formats CVBS and MAC bb in common. The detector will now again select the format having the higher picture quality, which means that a detector signal is applied to the switches 12 and 31 so that they assume the states in which terminals 10 and 11 or 30 and 32, respectively, are coupled to each other.

In the foregoing it was assumed that the device 2 was a video recorder and device 3 a picture screen and that a CVBS video signal is generated by the device 1 and simultaneously recorded on a video recorder and visualized on the picture screen.

Switching off the device 3 means a change-over to the YIC video signal. This change-over may result in disturbances in the recording of the video signal on the video recorder. In order to avoid this result, the detector 36 may comprise a "quality lock not-up" option which may be switched on by the user. Such an option means that when, for example, device 3 is switched off, which may lead to changing to a different video signal format, i.e. a video signal format having a higher picture quality, this change is counteracted. However, this does have the disadvantage of recording the video signal on the video recorder with a low picture quality although a higher picture quality is feasible.

There may also be a "quality lock not-down" option on the detector, which avoids that when device 3 is switched on, the CVBS quality is changed to if a video signal having the Y/C format is recorded on the video recorder in device 2. The consequence of this is that device 3 then does not receive any usable signal.

Figure 2:
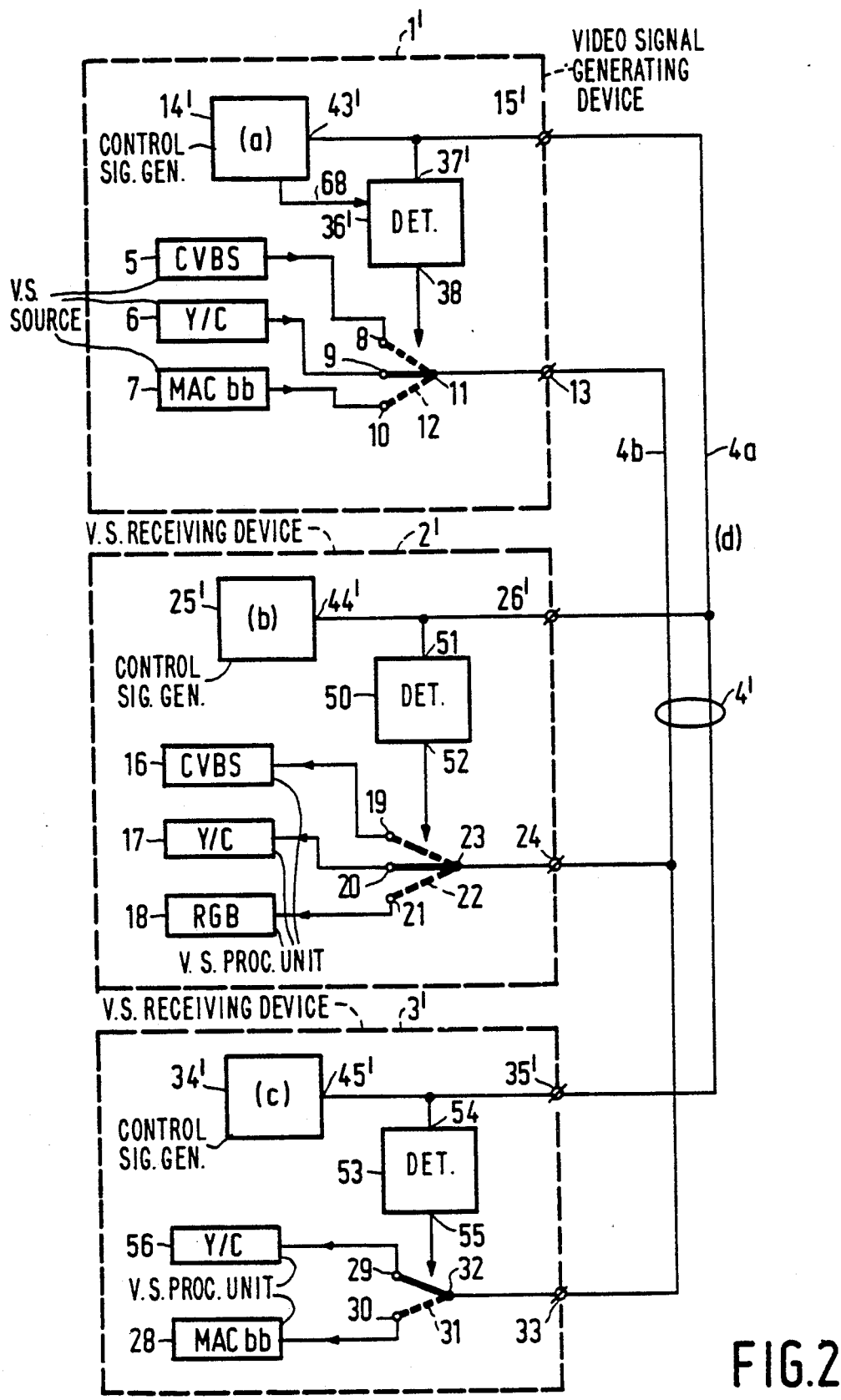
FIG. 2 shows a second exemplary embodiment.

FIG. 2 show a second exemplary embodiment of the video system. The video system again comprises three devices: a video signal generating device 1', and two video signal receiving device 2' and 3', and furthermore a signal bus 4'.

The device 1' in FIG. 2 shows much similarity to the device 1 shown in FIG. 1. The control signal generator 14' now has a different structure and has a single output 43' coupled to the control signal output 15' also in the form of a single output. The detector 36' has and input 37' coupled to the output 15'.

The device 2' shows much similarity to the device 2 shown in FIG. 1. The control signal generator 25' here too has a different structure and has a single output 44' coupled to the (single) control signal output 26'. The device 2' furthermore comprises a detector 50 operating in exactly the same manner as detector 36'.

The device 3' comprises a signal processor 28 for processing a MAC baseband signal, a processor 56 for processing a Y/C video signal, a control signal generator 34' having a single output 45' coupled to the single control signal output 35', and a detector 53 operating in the same fashion as the detector 36'.

The operation of the video system shown in FIG. 2 will now be explained with the aid of FIG. 3.

The control signal generator 14' is arranged for serially generating the control signals. This is visualized in FIG. 3a. The generator 14' recurrently generates a signal pattern as shown in FIG. 3a. First the generator 14' generates a start signal. This start signal is a signal change from O to V volts at the instant t0. In the time interval (t0, t1), this start signal remains "high" (+V volts). Subsequently, the generator 14' generates an acknowledge-request signal in the time interval (t1, t2). This acknowledge-request signal is a "high" signal (+V volts). Thereafter, generator 14' generates a first control signal (+V volts) in the time interval (t2, t3). This denotes that the device 11 can generate a CVBS video signal. In the time interval (t3, t4), the generator 14' generates again the first control signal (+V volts): the device 1' is able to produce a Y/C video signal. In the time interval (t4, t5), the generator 14' generates a second control signal by way of a "low" signal (0 volts): the device 1' cannot produce a RGB signal. In the time interval (t5, t6), the generator 14' generates a first control signal (+V volts) which corresponds to the fact that the device 11 is able to produce a MAC baseband signal. After instant t6, the signal becomes "low" (0 volts) and remains so until the generator 14' again generates the signal sequence as represented in FIG. 3a. The generator 25' in the device 2' detects at instant t0 the start signal as applied by the generator 14' to the line 4a in the signal bus 4'.

Once the generator 25' has recognized the start signal, the generator 25' generates a "low" signal (0 volts) as an acknowledge signal at its output 44' in the acknowledge-request time interval (t1, t2), cf. FIG. 3b. The purpose of this signal will be explained hereinbelow. In the time intervals (t2, t3), (t3, t4), (t4, t5) and (t5, t6) the generator 25' then generates at its output 44' a "high" signal again a "high" signal another "high" signal and a "low" signal.

This is because the device can process the CVBSI YIC and RGB signals but cannot process the MAC baseband signal.

Also the generator 34' detects the start signal at instant t0 and produces a "low" signal for an "acknowledge signal" in the "acknowledge-request" time interval (t1, t,), see FIG. 3c. In the subsequent time intervals (t2, t3), (t3, t4), (t4, t5) and (t5, t6), the generator 34' then produces a "low" signal, a "high" signal, a "low" signal, and yet another "high" signal. This because the device 3' cannot process the CVBS and RGB signals but can process the Y/C and MAC baseband signals. The ultimate signal on line 4a is represented in FIG. 3d. Since the "low" second auxiliary signal having 0 volts is dominant, the signal on line 4a will become "low" (0 volts) for a certain time interval if one of the devices generates a second auxiliary signal in this time interval.

As appears from FIG. 3d, the signal on line 4a is "low" for the time intervals (t1, t2), (t2, t3), (t4, t5) and (t5, t6). Only for the time interval (t3, t4) is the signal "high" (+V volts). The detectors 36', 50 and 53 all detect that only in the time interval (t3, t4) the signal on line 4a is "high". This means that all devices have the Y/C signal format in common. The detectors 36', 50, 53 each present a detector signal at their respective outputs 38, 52 and 55 so that the switches 12, 22 and 31 assume the states represented in FIG. 2.

The start signal generated by the device 1' in the time interval (t0, t1) has for its aim to start the timing in the devices 2' and 3' so that all devices generate in the same time interval exactly coinciding first or second control signals depending on whether or not a device is suitable for generating or processing the video signal format concerned.

In the time interval (t1, t2) in which the device 1' generates the acknowledge-request signal (+V volts) and hence establishes the "acknowledge-request" interval, the other devices 2' and 3' generate an "acknowledge signal" which is "low". The device 1' can thus detect whether a "low" signal (0 volts) is carried on line 4a in the time interval (t1, t2). This detection could be performed in the control signal generator 14' itself. If a "low" signal is detected on line 4a in the time interval (t1, t2), the device 1' knows that there are devices 2' and 3' connected to the signal bus which are suitable for generating the control signals for establishing the video signal format common to all devices.

Should only devices be connected to the signal bus 4' which do not comprise a control signal generator such as the generators 24' and 35', one may consider in this respect the video recorders and picture screens already available in the households, the signal on line 4a will remain "high" in the time interval (t1, t2) in which the control signal generating device 14' generates the "acknowledge-request" signal. The device 1' is then notified that no further devices are connected to the signal bus 4' which are suitable for cooperation with the device 1' over line 4a for establishing a common video signal format. In that case, the device 1' automatically changes to the lowest video signal quality. This means that the detector 36' generates a detector signal in response to which the switch 12 is moved to a state in which terminal 8 is connected to terminal 11. The device 1' then produces a CVBS signal at the output 13.

Starting from the situation in which the devices 1', 2' and 3' are coupled to each other over the signal bus 4', for example, device 3' is now switched off. This implies that the signal in FIG. 3c is no longer generated. The signal on the line 4a now becomes "high" in the time intervals (t2, t3) and (t3, t4). The detectors 36' and 50 will select the video signal format having the higher signal quality. This denotes that the switches 12 and 22 retain their states as shown in FIG. 2. Thus, no change to the CVBS format is made.

Based on the initial situation in which the devices 1', 2' and 3' are coupled to each other over signal bus 4', the device 2' is now switched off. This means that in the time intervals (t3, t4) and (t5, t6), the control signal on line 4a is "high". In this case the detectors 36' and 53 will move the switches 12 and 31 to the states in which the terminals 10 and 11 are coupled together and the terminals 30 and 32 are coupled together.

Also the video system shown in FIG. 2 may have the "quality lock not-up" and/or the "quality lock not-down" option which may be switched on by the system user.

Figures 4, 5:
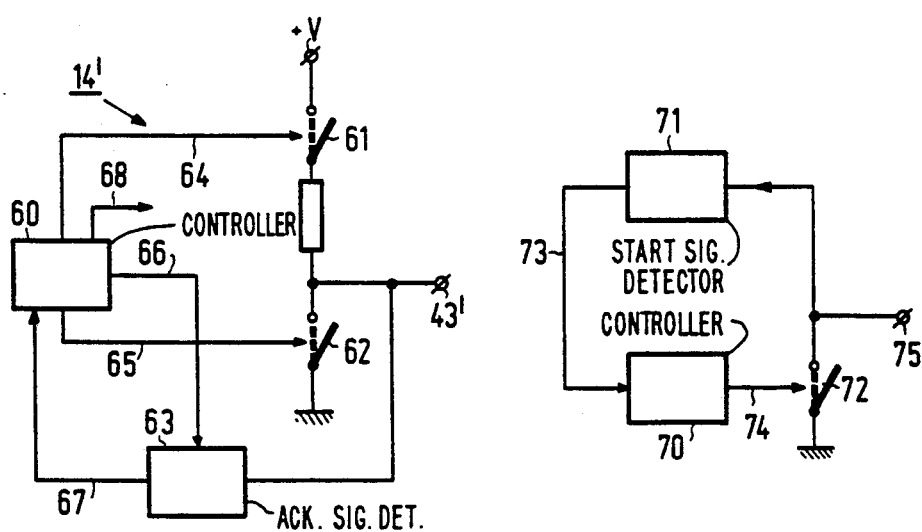
FIG. 4 shows an example of a control signal generator.
FIG. 5 shows another example of a control signal generator.

FIG. 4 diagrammatically shows an exemplary embodiment of the control signal generator 14' in the device 1' of FIG. 2. The generator 14' in FIG. 4 comprises a controller 60 applying switching signals to switches 61 and 62 and an enable signal to an "acknowledge signal" detector 63.

For generating the start signal in the time interval (t0, t1) in FIG. 3a, the controller 60 sends a switching signal over line 64 to the switch 61, causing the latter to close at instant t=t0, and sends a switching signal over line 65 to the switch 62, causing the latter to open at the instant t=t0. The signal remains present until the instant t=t4. The controller 60 again generates a switching signal on the lines 64 and 65 so that at the instant t=t4, the switch 61 opens and switch 62 closes. At the instant t=t5, the controller 60 again sends a switching signal onto the lines so that at t=t5, the switch 61 closes and switch 62 opens. At the instant t=t6, the switching signal is generated once again so that the switch 61 opens and switch 62 closes. In the time interval t1, t2, the controller 60 additionally generates an enable signal on line 66. In response to this enable signal, the "acknowledge signal" detector 63 is activated for detecting in the time interval (t1, t2) whether the signal on line 4a, that is the signal at the output 43' $ becomes "low" due to the presence of the devices 2' and 3'. If this "low" control signal is detected by the detector 63, it will apply a detection signal to the controller 60 over the line 67. In response to this detection signal, the controller 60 continues generating the switching signals for the switches 61 and 62. If the detection signal is lacking, the controller 60 will stop generating the switching signals. The controller 60 will then generate over line 68 a control signal which will be applied to the detector 36'. In response to this control signal, the detector 36' will then generate a detector signal so that the switch 12 assumes the state in which the terminals 8 and 11 are coupled to each other.

Two further possible exemplary embodiments of the control signal generator 14' in the device 1' are represented in the FIGS. 9a and 9b. These exemplary embodiments show much similarity to the control signal generator shown in FIG. 4. The differences are that in the exemplary embodiment represented in FIG. 9a, the switch 62 is replaced with an impedance by way of a high-ohmic resistor 62'. The controller 60 does not need to generate the switching signals for the switch 62 in FIG. 4. The switching signals applied to switch 61 over line 64 are the same as those of FIG. 4.

In the exemplary embodiment of FIG. 9b, the switch 61 is replaced with an electrical interconnection. The controller 60 does not need to generate the switching signals for the switch 61 in FIG. 4. The switching signals applied to switch 62 over line 65 are the same as those of FIG. 4.

FIG. 5 shows an exemplary embodiment of the control signal generator in the devices 2' or 3' in FIG. 2. The control signal generator shown in FIG. 5 represents a controller 70, a start signal detector 71 and a controllable switch 72. At the instant t=t0, the switch 72 is open. The start signal detector 71 detects the start signal generated by the control signal generator 14' of the device 1' in the time interval (t0, t1). The detector 71 then generates a detection signal to be applied to the controller 70 over the line 73. At the instant t=t1, the controller 70 then generates a switching signal to be applied to the control signal input of switch 72 over the line 74. The switch 72 then closes during the time interval (t1, t2). Hence, output 75 of the control signal generator becomes "low" (the "acknowledge signal").

If the control signal generator shown in FIG. 5 is included in the device 2', the controller 70 is yet to generate switching signals at the instants t=t2 and t=t5 for generating the signal of FIG. 3b. If the control signal generator is included in the device 3', the controller 70 is yet to generate switching signals at the instants t=t3, t=t4, t=t5 and t=t6.

FIG. 6 shows by way of a Table the operation of the detector 36' shown in FIG. 2. The left part of the Table shows any combination of first and second control signals for the four time intervals corresponding to the four signal formats, while the first control signal is denoted by a logic "1" and the second control signal by a logic "0". In the right part of the Table, the choice of the device 1' on a certain video signal format is shown under the heading of "choice". If no "acknowledge signal" is received, the device 1' will change to the CVBS video signal as is shown on the bottom line of the Table.

Self-evidently, the operation as shown in FIG. 6 also applies to the device 1 shown in FIG. 1. Therefore, the four columns also bear the reference numbers 37.1 to 37.4 for the inputs to the detector 36 shown in FIG. 1. In the same fashion, the Table shown in FIG. 7 clarifies the operation of device 2' shown in FIG. 2 and the Table in FIG. 8, the operation of the device 3' shown in FIG. 3.

From the last two lines of FIG. 7, it appears that the detector 50 is to know which of the two video signal formats, the Y/C or RGB formats, which have virtually equal quality, is to be chosen.

FIG. 10 shows a different exemplary embodiment of a video signal generating device 1" in the form of a video tuner. By means of an aerial 70, video signals transmitted by various kinds of transmitters can be received. One may think of transmitters, for example, transmitting MAC video signals and transmitters transmitting PAL video signals. Tuning the tuner to one transmitter or the other, by means of the tuning element 90, means that a MAC signal is received in one case and a PAL signal in the other. The tuner comprises a video signal detector unit 71 which can detect whether the received signal present at the output 91 of the tuning element 90 originates from a MAC transmitter or a PAL transmitter. Depending on the detected signal, the detector unit 71 produces a control signal at an output 72. This control signal is applied to control signal inputs of controllable switches 73 and 74 and to an input 75 of the control signal generator 14".

If tuner 1" is tuned to a PAL transmitter, the detector unit 71 will generate a control signal in such a way that the switches 73 and 74 assume the state different from the one shown in the diagram. The signal received through the aerial is thereby applied to the PAL processor 76 which renders the signal received from the aerial into a PAL video signal.

In response to the control signal applied to the control signal generator 14" by the detector unit 71, this generator generates at its output 77 a first control signal for PAL and/or a second control signal for MAC. Assuming that the video signal receiving device(s) connected to the video signal generating device 1" can at least receive the PAL signal, the detector 36' will present a detection signal at its output 38 so that the controllable switch 12' assumes a state so that the output 78 of the PAL processor 76 is coupled to the video signal output 13.

It is now assumed that the tuner 1" is tuned to a MAC transmitter. The detector unit 71 will generate a control signal in such a way that the switches 73 and 74 assume the states shown in the drawing Figure. This means that the signal received through the aerial is applied to the MAC processor 79 which renders the signal received through the aerial into a HAC video signal. Since the tuner 1" also comprises a MAC-PAL converter 81, the MAC video signal is available at the terminal 82 of switch 12' and the PAL video signal is available at the terminal 83 of the switch 12'. The generator 14" will now generate a first control signal for both MAC and PAL.

From this it appears that the generator 14" is capable of presenting various kinds of control signals at its output 77 depending on the tuning of the tuner 1" to a transmitter. Depending on the connected video signal receiving device(s), the detector 36' subsequently chooses the common video signal format: that is to say, MAC or PAL. In the former case, the terminal 82 of switch 12; and in the latter case, the terminal 83 of this switch 12' is connected to the output 13.

A different exemplary embodiment of a video signal generating device is a "transparent" video recorder. A video recorder of this type is capable of recording PAL, MAC or different kinds of video signals unmodified on a magnetic tape and also capable of reproducing them. A video recorder of this type will additionally comprise converters for converting the MAC signal, if reproduced, into a PAL or RGB signal depending on the functions of these converters.

If a magnetic tape cassette is loaded on which, for example, a PAL video signal is recorded, the video recorder will generate first and/or second control signals from which it appears that the video recorder is capable of (solely) producing a PAL video signal.

However, if a cassette is loaded on which a MAC video signal is recorded, the video recorder will generate first and/or second control signals from which it appears that the video recorder is capable of generating MAC, PAL and RGB signals.

Figure 3:
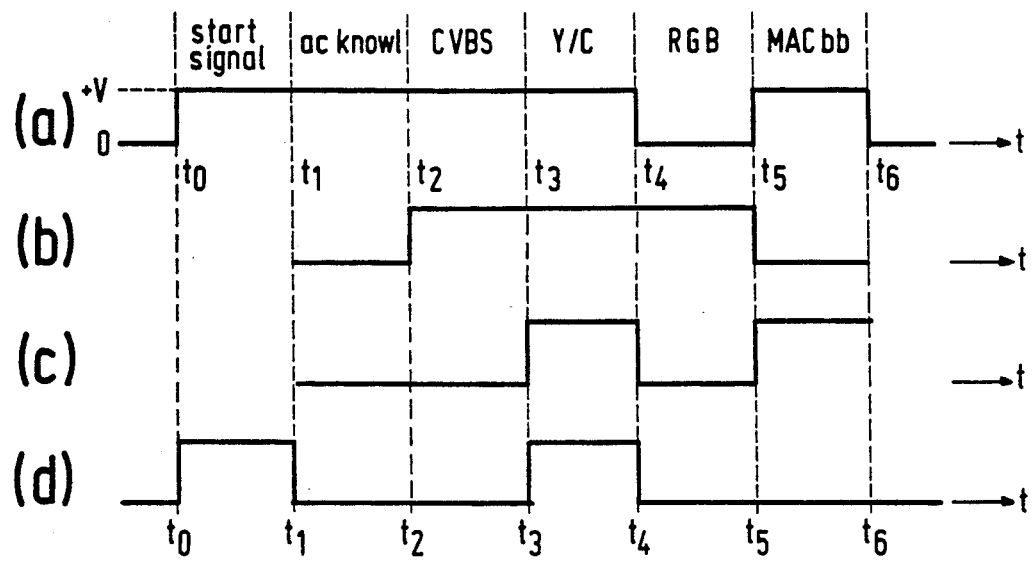
FIG. 3 shows the serial data stream for the control signals in the exemplary embodiment of FIG. 2.

The control signals represented in FIG. 3 can be extended by still further information. For example, an additional time interval in the serial data stream of FIG. 3a can be reserved for indicating whether the video signal generating device is capable of generating a video signal having pictures with a 16×9 aspect ratio or only a video signal with the standard 4×3 aspect ratio. In the former case, a first control signal ("high" or +V volts) is generated, in the latter case a second control signal ("low" or 0 volts). Alternatively, it is possible to reserve an additional time interval for indicating whether the audio signal belonging to the video signal is a mono signal or a stereo signal. In the former case again a first control signal ("high" or +V volts), and in the latter case, a second control signal ("low" or 0 volts) can be generated.

Furthermore, an additional time interval can be reserved for indicating whether the audio signal belonging to the video signal is for example bilingual or not. The detectors 36', 50 and 53 may further be arranged in such a way that a detector signal at the outputs 38, 52 and 53 will be arranged only after the same serial data stream of FIG. 3d recurrently present on the line has been detected a number of times, for example, five times. This may decrease the liability to disturbance. Since the signal on line 4a is "low" outside the time intervals (the time interval t0, t6 in FIG. 3) during which the control signals are recurrently transmitted, the system is compatible for future extensions of the number of possible video signal formats in the system.

Let it be assumed that the system is suitable for the four video signal formats as represented in FIG. 3. Future devices (video signal generating or video signal receiving devices) could be capable of generating or processing in excess of four video signal formats, for example a fifth video signal format. Such a new device will then produce, in additional time interval t6, t7 (not shown in FIG. 3), a first control signal ("high") on the line 4a. Since the other devices in the system are not capable of generating or processing this fifth video signal, the signal on line 4a will still remain "low" during the time interval t6, t7. Although the new device is thus capable of generating or processing the video signal according to the fifth format, this device will not operate in that mode. Only after all further devices in the system have meanwhile been replaced with devices that are capable of also handling the video signal according to the fifth format will it be possible for the video signal according to the fifth format to be conveyed between the various devices.

We claim:

1. Video system comprising a video signal generating device, at least one video signal receiving device, and a signal bus, the video signal generating device having a video signal output for producing a video signal and the video signal receiving device having a video signal input for receiving the video signal, the video signal input of the at least one video signal receiving device being coupled to the video signal output of the video signal generating device over the signal bus, characterized in that the video signal generating device comprises means for generating a video signal according to x number of video signal formats from a total of y number of possible video signal formats, in that the at least one video signal receiving device comprises means for receiving and processing a video signal according to z number of video signal formats from the y number of possible video signal formats, in that for y it holds that $y > 1$, and for x and z it holds that $1 \leq x \leq y$ and $1 \leq z \leq y$, in that the video signal generating device further comprises a control signal generator for generating a first control signal for each of the x video signal formats and for generating a second control signal for each of the y-x remaining video signal formats, and for producing the x first and y-x second control signals at control signal output means of the video signal generating device, in that the at least one video signal receiving device further comprises a further control signal generator for generating the first control signal for each of the z video signal formats and for generating the second control signal for each of the y-z remaining video signal formats and for producing the z first and y-z second control signals at control signal output means of the at least one video signal receiving device, in that the control signal output means of the video signal generating device and the control signal output means of the at least one video signal receiving device are coupled, respectively, to each other over the signal bus, in that the video system further comprises a detector unit having means for establishing, in response to the first and second control signals, the p video signal formats common to the video signal generating device and the at least one video signal receiving device from the y possible video signal formats, in that the detector unit has input means coupled, respectively, to the control signal output means of one of said video signal generating device and said at least one video signal receiving device and has an output for producing, for $p=1$, a detector signal indicative of the one common video signal format, and for producing, for $p \geq 2$, a detector signal that is indicative of one of the p common video signal formats, and for applying the detector signal to the video signal generating device and the at least one video signal receiving device, in that the video signal generating device further comprises means for causing said video signal generating device to produce a video signal at its video signal output in accordance with the common video signal format established by the detector unit in response to the detector signal, and in that the at least one video signal receiving device further comprises means for adjusting the at least one video signal receiving device in response to the detector signal so that the video signal can be processed by the at least one video signal receiving device in accordance with the video signal format determined by the detector unit.

2. Video system as claimed in claim 1, characterized in that the first control signal is a signal having a first potential and the second control signal is a signal having a second potential.

3. Video system as claimed in claim 1, characterized in that the signal bus is a SCART cable and in that the control signal outputs of the video signal generating device and the video signal receiving devices are coupled to each other over line number 10 in the SCART cable.

4. Video system as claimed in claim 1, characterized in that the signal bus is a SCART cable and in that the control signal outputs of the video signal generating device and the video signal receiving devices are coupled to each other over line number 12 in the SCART cable.

5. Video system as claimed in claim 1, characterized in that the control signal generator in the video signal generating device comprises means for serially generating, in a specific fixed order for the y possible video signal formats, the x first control signals for each of the x video signal formats and for serially generating the y-x second control signals for each of the y-x remaining video signal formats, in that the further control signal generator is the at least one video signal receiving device comprises means for serially generating, in the same order for the y possible video signal formats, the z first control signals for each of the z video signal formats and for serially generating the y-z second control signals for each of the y-z remaining video signal formats, and in that an output of a control signal generator is coupled to the control signal output of the associated device.

6. Video signal receiving device for use in the video system as claimed in claim 5 in which the video signal generating device includes a control signal generator recurrently generating the x first and y-x second control signals, the recurrence of these control signals lying certain time-intervals apart, the second control signal being generated during these time-intervals intervening the recurrences of the x first and y-x second control signals, characterized in that the further control signal generator in the video signal receiving device generates the second control signal during the certain time-intervals.

7. Video signal generating device for use in the video system as claimed in claim 5, characterized in that the control signal generator comprises means for recurrently generating the x first and y-x second control signals, the recurrences of these control signals lying certain time-intervals apart.

8. Video signal generating device as claimed in claim 7, characterized in that the control signal generator generates the second control signal during the certain time-intervals intervening the recurrences of the x first and y-x second control signals.

9. Video system as claimed in claim 1, characterized in that the detector unit comprises means for producing, for $p \geq 2$, a detector signal that is indicative of the video signal format of the p common video signal formats having the highest video signal quality.

10. Video system as claimed in claim 1 or 9, characterized in that the control signal output means of the video signal generating device and the at least one video signal receiving device each have y sub-outputs while each of the y control signal sub-outputs corresponds to one of the y possible video signal formats, in that each of the y control signal sub-outputs of one of said video signal generating device and the at least one video signal receiving device is coupled to a corresponding sub-output of the y control signal sub-outputs of the others of said video signal generating device and the at least one video signal receiving device over an associated signal line in the signal bus, and in that the control signal generator in a device has y outputs, each of the y outputs being coupled to an associated control signal sub-output of the device, in that the control signal generator in the video signal generating device comprises means for producing the first control signal at the x outputs corresponding to the x video signal formats and for producing the second control signal at the y-x remaining outputs, and in that the further control signal generator in the at least one video signal receiving device comprises means for producing the first control signal at the z outputs corresponding to the z video signal formats and for producing the second control signal at the y-z remaining outputs.

11. Video system as claimed in claim 1 or 9, characterized in that the video signal generating device and the at least one video signal receiving device each comprise a detector which collectively comprise the detector unit, each of said detectors comprising means for establishing the p common video signal formats and for generating the detector signal, in that the detectors have each an input coupled to the control signal output means of the associated device and an output for producing, for $p=1$, the detector signal that is indicative of the one common signal format and for producing, for $p \geq 2$, the detector signal that is indicative of one and the same video signal format of the p common video signal formats, in that the video signal generating device comprises means for causing the video signal generating device to produce a video signal at its video signal output in response to the detector signal of the associated detector according to the common video signal format selected by this detector, and in that the at least one video signal receiving device comprises means for adjusting the at least one video signal receiving device in response to the detector signal of the associated detector in such a way that the video signal applied to its video signal input can be processed.

12. Video signal generating device for use in the video system as claimed in claim 11, characterized in that the video signal generating device comprises the detector forming part of the detector unit and in that the detector is arranged for detecting, for each of the x video signal formats, the presence of a second control signal generated by the video signal receiving devices, and is arranged for establishing the p video signal formats of the x video signal formats for which none of the video signal receiving devices have generated a second control signal.

13. Video signal receiving device for use in the video system as claimed in claim 11, characterized in that the video signal receiving device comprises the detector forming a part of the detector unit, and in that the detector comprises means for detecting, for each of the z video signal formats, the presence of a second control signal generated by the video signal generating device of a different video signal receiving device, in that the detector comprises means for establishing the p video signal formats from the z video signal formats for which none of the other devices have generated a second control signal.

14. Video system as claimed in claim 1 or 9, characterized in that the detector unit is included in one of the video signal generating device and the at least one video signal receiving device, in that the output of the detector unit is coupled to a detector signal output of said one of the video signal generating device and the at least one video signal receiving device, and in that the others of the video signal generating device and the at least one video signal receiving device have each a detector signal input which is coupled, over the signal bus, to the detector signal output of said one of said video signal generating device and the at least one video signal receiving device.

15. Video system as claimed in claim 14, characterized in that said one of said video signal generating device and the at least one video signal receiving device is said video signal generating device.

16. Video signal receiving device for use in the video system as claimed in claim 15, characterized in that the video signal receiving device comprises z ($z \geq 2$) video signal processing units and controllable switching means, in that the video signal input is coupled to an input of the controllable switching means, in that the controllable switching means have z outputs coupled, respectively, to inputs of said z video signal processing units, in that the output of the detector unit is coupled, through a detector signal input of the video signal receiving device, to a control signal input of the controllable switching means, and in that the controllable switching means couples the video signal input to the input of the video signal processing unit arranged for processing the video signal according to the video signal format established by the detector unit, in response to the detector unit signal applied to the control signal input.

17. Video signal receiving device as claimed in claim 16, characterized in that the video signal receiving device further comprises the detector unit.

18. Video signal receiving device as claimed in claim 16, wherein the first control signal is a signal having a first potential and the second control signal is a signal having a second potential, characterized in that the further control signal generator comprises a first controllable switch inserted between a point having the first potential and the output, and a second controllable switch inserted between the output of the control signal generator and a point having the second potential, in that for generating the first control signal at the control signal output for one of the z video signal formats, the further control signal generator establishes a connection between the point having the first potential and the output by closing the first controllable switch, and in that for generating the second control signal at the output for one of the y-z remaining video signal formats, the further control signal generator establishes a connection between the point having the second potential and the output by closing the second controllable switch.

19. Video signal generating device for use in the video system as claimed in claim 15, characterized in that the video signal generating device further comprises the detector unit, x (x≧2) video signal sources for producing, respectively, video signals in accordance with the x number of video signal formats, and controllable switching means, in that the outputs of the x video signal sources are coupled to the associated x inputs of the controllable switching means of which an output is coupled to the video signal output of the video signal generating device, in that the output of the detector unit is coupled to a control signal input of the controllable switching means, and in that, in response to the detector signal of the detector unit applied to the control signal input, the controllable switching means coupled a selected one of the x video signal sources to the video signal output, said selected one of the x video signal sources producing the video signal according to the video signal format established by the detector unit.

20. Video signal generating device as claimed in claim 19, wherein the control signal generator in the video signal generating device comprises means for serially generating, in a specific fixed order for the y video signal formats, the x first control signals for each of the x video signal formats and for serially generating the y-x second control signals for each of the y-x remaining video signal formats, and in that an output of the control signal generator is coupled to the control signal output of the video signal generating device, and wherein the first control signal is a signal having a first potential and the second control signal is a signal having a second potential, characterized in that the control signal generator comprises a first controllable switch inserted between a first point having the first potential and the output of the control signal generator, in that for generating the first control signal at the output for one of the x video signal formats, the control signal generator establishes a connection between the first point having the first potential and the output by closing the first controllable switch.

21. Video signal generating device as claimed in claim 20, characterized in that the control signal generator further includes an impedance inserted between the first point having the first potential and the output of the control signal generator.

22. Video signal generating device as claimed in claim 20, characterized in that the control signal generator comprises a second controllable switch inserted between the output of the control signal generator and a second point having the second potential, and in that for generating the second control signal at the output for one of the y-x remaining video signal formats, the control signal generator establishes a connection between the second point having the second potential and the output by closing the second controllable switch.

23. Video signal generating device as claimed in claim 22, characterized in that the control signal generator further includes an impedance inserted between the output of the control signal generator and the second point having the second potential.

* * * * *